United States Patent
Averkamp (10) Patent No.: US 6,865,403 B1
(45) Date of Patent: Mar. 8, 2005

(54) METHOD AND SYSTEM FOR SIMPLIFIED CONTROL OF A SUBSCRIBER TERMINAL

(75) Inventor: Joseph Averkamp, Canton, MI (US)

(73) Assignee: Sprint Spectrum L.P., Overland Park, KS (US)

( * ) Notice: Subject to any disclaimer, the term of this patent is extended or adjusted under 35 U.S.C. 154(b) by 443 days.

(21) Appl. No.: 09/724,004

(22) Filed: Nov. 28, 2000

(51) Int. Cl.[7] .................................................. H04B 1/38
(52) U.S. Cl. .................. 455/564; 455/469.2; 455/575.1
(58) Field of Search ................................. 455/563, 564, 455/565, 575.1, 569.1, 569.2

(56) References Cited

U.S. PATENT DOCUMENTS

| | | | | |
|---|---|---|---|---|
| 5,584,052 A | * | 12/1996 | Gulau et al. | 455/79 |
| 5,794,163 A | * | 8/1998 | Paterson et al. | 455/575.2 |
| 5,915,228 A | * | 6/1999 | Kunihiro et al. | 455/575.1 |
| 6,035,217 A | * | 3/2000 | Kravitz | 455/561 |
| 6,128,514 A | * | 10/2000 | Griffith et al. | 455/564 |
| 6,240,303 B1 | * | 5/2001 | Katzur | 455/563 |
| 6,377,825 B1 | * | 4/2002 | Kennedy et al. | 455/569.2 |
| 6,449,497 B1 | * | 9/2002 | Kirbas et al. | 455/564 |
| 6,453,169 B1 | * | 9/2002 | Maloney | 455/575.1 |
| 6,459,911 B1 | * | 10/2002 | Hijii | 455/563 |
| 6,519,463 B2 | * | 2/2003 | Tendler | 455/456.3 |
| 6,549,790 B1 | * | 4/2003 | Rubbmark et al. | 455/557 |

* cited by examiner

Primary Examiner—Lester G. Kincaid
Assistant Examiner—Sam Bhattacharya (57) ABSTRACT

A method and system for establishing subscriber terminal communications. An actuator, which may be as simple as a single pushbutton switch for instance, may be engaged by a human so as to send an actuation signal to a controller that preferably resides external to the subscriber terminal. The controller receives the actuation signal and further receives an indication of the status of the subscriber terminal (such as whether the terminal is currently engaged in a call, is idle, or is ringing). Based on the actuation signal and the status of the subscriber terminal, the controller determines an action to be taken by the subscriber terminal. The controller then sends a directive to the subscriber terminal, which causes the subscriber terminal to take the action. In one arrangement, for instance, the action may be the subscriber terminal dialing digits that are sufficient to cause a dial-up-connection to a voice-activated-dialing platform. Once connected to the platform, the human may then speak commands to the voice-activated-dialing platform and the platform may appropriately perform an action based on the commands.

22 Claims, 4 Drawing Sheets

METHOD AND SYSTEM FOR SIMPLIFIED CONTROL OF A SUBSCRIBER TERMINAL

FIELD OF THE INVENTION

The invention relates to telecommunications services and more particularly to interactions between subscriber terminals and network entities such as voice-activated dialing platforms.

BACKGROUND OF THE INVENTION

A telecommunication network may provide a variety of services for users of the network. One such service is a voice-activated-dialing (VAD) service, according to which a user may call into a special network entity (e.g., a VAD server) and speak a name or number to be dialed, and the network entity may then initiate the call (or cause the call to be initiated).

For instance, a user operating a subscriber terminal (e.g., a telephone) may dial the telephone number of a VAD server and may then speak a phrase so as to initiate a call. The user may, for example, speak the phrase, "Call John Smith." In response, the VAD server may consult a stored contact list associated with the user to determine the telephone number or other network address of John Smith, and the VAD server may then initiate (or cause to be initiated) a call to that number of address. For instance, the VAD server may itself place a call to John Smith and may then tic that call together with the user's call, via a conference bridge.

Alternatively, the VAD server may signal to a telecommunications switch in a way that instructs the switch to set up a call with John Smith and to connect the call with the user. (The switch may, for instance, apply well known ISUP signaling techniques to accomplish this call setup.)

Alternatively, as another example, the user might call the VAD server and then speak the phrase "Dial 555-1234." The VAD server may recognize the word "Dial" and the succeeding digits and may then responsively initiate a call to those digits and connect the call to the user.

Conventionally, a VAD server may employ a speech-recognition module, which is typically arranged to receive speech signals and to recognize speech patterns in the signals by comparison to predefined speech patterns stored in a reference database. The speech patterns stored in the reference database may represent the most common phrases encountered in a given language, for instance, and therefore represent the phrases that are likely to be detected in speech signals received from users.

The subscriber terminal that a user employs to contact a VAD server or other such entity could take any of a variety of forms. By way of example, the subscriber terminal could be a landline terminal (e.g., fixed telephone) or a wireless terminal (e.g., a cellular telephone or other mobile station). Typically, the subscriber terminal will be arranged to access a telecommunications network, e.g., via a local switch, which may then function to couple the subscriber terminal with the VAD server. For instance, in a typical cellular radio-frequency communications network, a mobile station may communicate via an air interface with a base transceiver substation (BTS) at the core of a cell, and the BTS may then convey signals from the mobile station to a base station controller (BSC) and in turn to a mobile switching center (MSC). Upon receipt of a request from the mobile station, the MSC may set up and establish a call path between the mobile station and a port on the VAD server.

A wireless subscriber terminal, for instance, will usually include a user interface including a numeric keypad, a "Talk" (or "Send") button, an "End" button, and other controls. Separate controls are thus typically provided to enable a user to initiate calls, place calls and/or activate various subscriber services. Modem wireless subscriber terminals also usually include an alphanumeric display suitable for displaying digits that a user is dialing and for displaying a variety of information and messages.

Conveniently, a mobile station can be mounted or otherwise provided in a vehicle, such as a car, truck, aircraft, sea vessel or other entity arranged to be controlled by and to transport a human. For instance, in-car cellular telephones have become commonplace. While driving a car, a person can therefore initiate and receive calls on a cellular telephone. One such call may be a call to a VAD server, for example.

Unfortunately, however, using a wireless subscriber terminal while driving a car or other vehicle can sometimes be dangerous. In particular, where the subscriber terminal requires the user to press a variety of keys (e.g., a sequence of keys) to accomplish a variety of functions (e.g., to dial a telephone number), the user may be forced to look at the subscriber terminal to find the appropriate keys. Further, while talking on a subscriber terminal, the user may be forced to hold the terminal in one hand, thus leaving only the user's other hand to control the vehicle. As a result, a driver can lose control of the vehicle, which can lead to injury.

In an effort to alleviate this problem, hands-free units have been developed for use with wireless subscriber terminals in vehicles. In a common arrangement, for instance, a hands free unit may include a microphone and speaker (or may employ the existing speaker system in the vehicle), and the unit may then include a connector configured to be connected to cellular telephone (e.g., by sitting the telephone in a cradle). The connector typically provides a power source to the telephone and includes audio line-in and line-out functions so as to facilitate feeding speech signals from the microphone to the telephone and feeding speech signals from the telephone to the speaker.

While this arrangement may work to reduce a driver's interaction with a telephone while driving, it may still require the driver to initially dial a telephone number. For at least this reason, a more robust solution is desired.

SUMMARY OF THE INVENTION

In accordance with an exemplary embodiment of the present invention, a method and system is provided for simplifying the use of a wireless subscriber terminal, such as in establishing or releasing connections with or through a VAD server for instance.

According to the exemplary embodiment, a module is provided in communication with a wireless subscriber terminal. The control module preferably includes a simple button or other such actuator, which a user may readily engage (selectively, i.e., when the user wants to do so) in order to cause the wireless subscriber terminal to carry out various predefined functions such as to place a call, to terminate a call, or to answer a call. One such predefined function, for example, may be to initiate a call to a VAD server. In turn, the control module preferably includes or is coupled to a microphone and speaker and is arranged to facilitate hands-free operation of the wireless subscriber terminal. The simple actuator may, for instance, be positioned near the microphone, so as to be viewed as functionally conjoined with the microphone.

Thus, in exemplary operation, a user may engage the actuator of the control module, which may cause the wireless subscriber terminal to call a VAD server. In turn, the user may then speak dialing commands into the microphone so as to cause the VAD server to initiate a specified call.

Further, in the exemplary embodiment, the effect(s) of engaging the actuator may vary depending on various factors or a combination of factors, such as (i) how long the actuator is engaged and (ii) the current state of the wireless subscriber terminal—e.g., whether the terminal is currently connected in a call, with whom the terminal is currently connected in a call, whether the terminal is receiving an incoming call, and so forth.

For example, if the terminal is currently powered on but is not connected in a call, then engaging the actuator may cause the terminal to dial digits (e.g., a feature code or a toll-free telephone number (or other such telephone number) for instance) suitable for establishing a dial-up connection over a telecommunications network to the VAD server. If the terminal is currently connected in a call, then engaging the actuator for an extended period of time (such as over a second for instance) may cause the terminal to dial its "End" key so as to terminate the call. If the terminal is receiving an incoming call (e.g., it is ringing), then engaging the actuator may cause the terminal to dial its "Talk" key so as to answer the call. If the terminal is currently engaged in a call via the VAD server, then engaging the actuator may cause the terminal to send a feature code or other predefined signal to the VAD server that causes the VAD server to terminate the current call but to retain the VAD server's connection with the terminal, so that the user may readily make another call. Of course, other examples are possible as well.

These as well as other features and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which:

FIG. 2b is a perspective diagram of the hands-free unit of FIG. 2a;

FIG. 2c is another perspective diagram of the hands-free unit of FIG. 2a;

DETAILED DESCRIPTION OF AN EXEMPLARY EMBODIMENT

Figure 1:
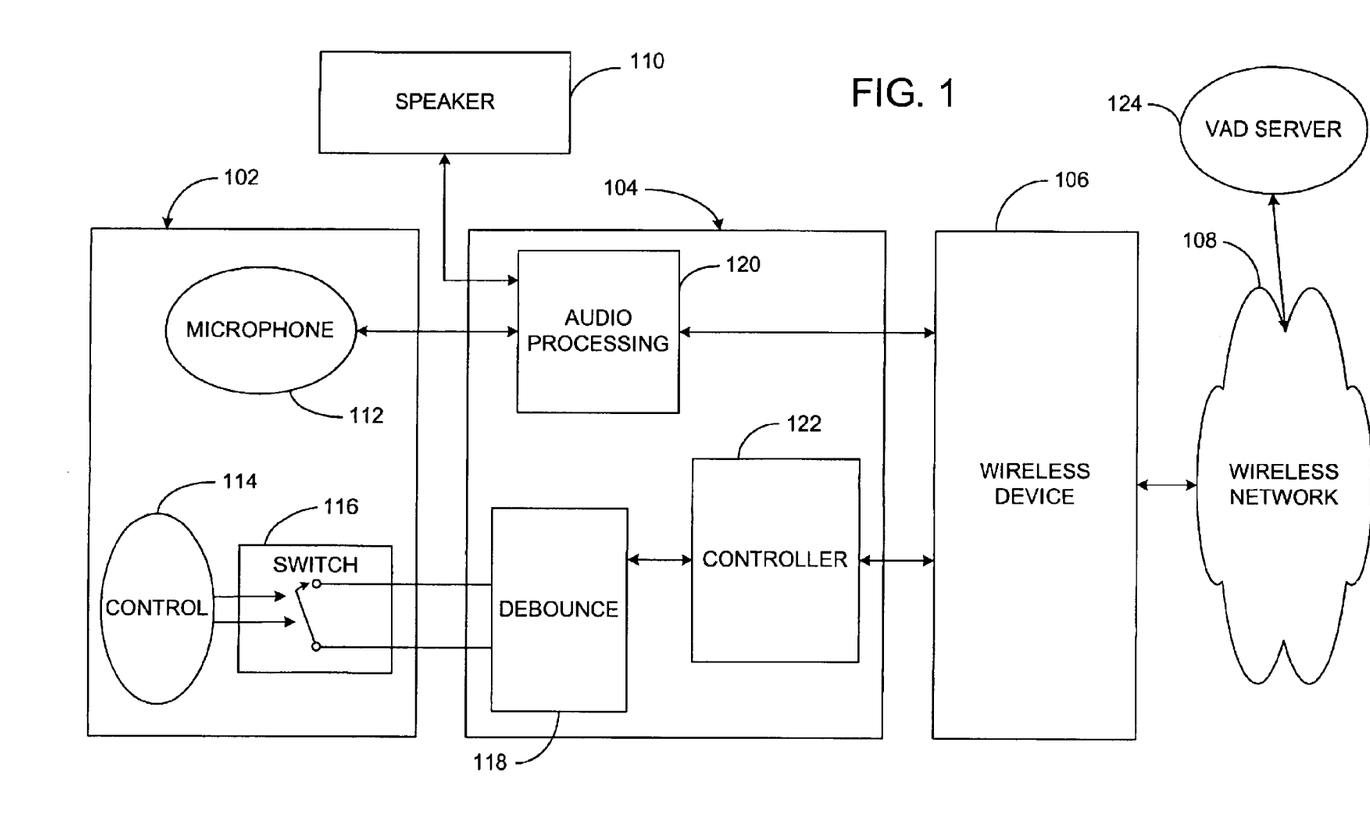
FIG. 1 is a block diagram of a system for implementing an exemplary embodiment of the present invention.

Referring to the drawings, FIG. 1 provides a block diagram of a system for implementing an exemplary embodiment of the present invention. It should be understood that the many of the elements described and illustrated throughout this specification are functional in nature and may be embodied in one or more physical entities or may take other forms beyond those described or depicted.

The system shown in FIG. 1 includes a hands-free unit 102, a telephone interface module (TIM) 104 and a wireless subscriber terminal 106. The wireless subscriber terminal 106 (which may be a cellular telephone, a personal digital assistant, or any other type of wireless communication device for instance) is shown coupled to a wireless communications network 108 (such as a cellular radio-frequency network for instance), which includes or is coupled with (directly or through one or more other networks or communication paths) a VAD server 124.

An exemplary hands-free unit 102 may include a microphone 112, a single actuator (or, equivalently, "control") 114, and a switch 116. The TIM 104 may in turn include an audio processing module 120, a debounce module 118, and a controller 122. The actuator may be coupled with the switch. Further, the microphone 112 may be coupled to the audio processing module 120, and the switch 116 may be coupled to the debounce module 118. The debounce module 118 may in turn be coupled with the controller 122. And both the audio processing module 120 and the controller 122 may be coupled with the wireless subscriber terminal 106.

The interfaces linking together the various components of the hands-free unit 102, the TIM 104 and the terminal 106 may be wired or wireless. For example, in one convenient embodiment, one or more of the interfaces may use shielded twisted pair wire (for audio connections) and a stranded copper wire (for all other connections). In another particularly convenient embodiment, for instance, one or more of the interfaces may be wireless interfaces facilitating communication between entities according to the well known Bluetooth recommendation for short-range wireless communications.

In the exemplary embodiment, the hands-free unit 102, TIM 104, and terminal 106 are all situated in a vehicle (such as, for instance, a car, truck, plane or ship), although the arrangement could just as well be in any other location such as an office, home, or on a person's body (e.g., as a portable hands-free unit). The hands-free unit (or one or more of its constituent parts) is preferably situated in close proximity to a user (such as a driver for instance), so that the user's voice can be readily picked up by the microphone and so that the user can readily engage the actuator. (As examples, the actuator can be mounted onto the vehicle dashboard, or the actuator id may be provided as a foot pedal. Other examples are possible as well.)

A typical vehicle will include a speaker 10, to which the audio processing module 120 of the TIM may be coupled, so as to facilitate emitting audio signals for the user to hear. Alternatively, the speaker could just as well be a headphone or earphone or other device that functions to emit audio signals for a user to hear. The speaker could be coupled to the TIM or to another entity via a wired or wireless interface.

In the exemplary embodiment, the microphone 112 of hands-free unit 102 may be any type of microphone that functions to capture human speech or other audio signals. In particular, the microphone 112 preferably functions to capture the human speech, to convert the speech into an analog electrical signal, and to send the analog electrical signal to the audio processing module 120 of TIM 104. The signal from the microphone may be provided to the audio processing module 120 via a wired or wireless transmission or by any other means.

The actuator 114 can take any of a variety of forms as well. Preferably, however, the actuator should be easy for a user to operate, without unduly distracting the user. Without limitation, some examples of types of actuators include (i) a pushbutton switch or pedal, (ii) a heat-activated switch, (iii) a touch-sensitive pad, and (iv) a rotary dial. The actuator may have a number of preset positions or states (recognizing that an actuator without moving parts may not have "positions" but may have only "states" in relation to an underlying state machine or controller), such as "in" (e.g., on) and "out" (e.g., off) for instance. Other examples are possible as well.

In the exemplary embodiment as illustrated in FIG. 1, the control takes the form of a spring-loaded pushbutton device that works in combination with switch 116 to open or close a electrical circuit. By engaging the actuator 114, a user may causes the switch 116 to be closed, which may consequently cause an electrical signal to be sent (via a wired or wireless connection) from a signal source to the controller 122 of the TIM 104 or may otherwise cause the controller 122 to detect that the actuator was engaged. Further, the electrical signal may effectively indicate a characteristic of the actuation. For instance, if the electrical signal lasts for a particular duration, the signal may indicate that the user engaged the actuator for that duration.

The audio processing module 120 of the TIM 104 may function to convert an analog electrical signal provided from the microphone 112 into a digital electrical signal, which the TIM 104 may then provide to the wireless subscriber terminal 106 for transmission into network 108. Similarly, the audio processing module 120 may function to convert a digital signal provided from the wireless subscriber terminal 106 into an analog electrical signal, which the audio processing unit may then provide to speaker 110 to be emitted for a user to hear.

The debounce module 118 may function to clean the electrical signal provided from switch 116. In this regard, as the switch 116 is closed by a user engaging the actuator 114, the resulting electrical signal may contain spikes or other undesirable characteristics. The debounce module 118 may function by means well known to those skilled in the art to remove the spikes and other undesirable characteristics, so as to present a substantially "clean" electrical signal to the controller 122.

The controller 122 may also take any of a variety of forms. For instance, the controller may comprise a microprocessor, a memory and various sets of machine language instructions (defining "routines", "programs" or "program logic") stored in the memory and executable by the microprocessor to carry out various functions described herein. Further, the memory, which may comprise volatile memory (e.g., RAM) and/or non-volatile memory (Flash), may serve to store data, such as indications of the state of subscriber terminal 106 (such as whether the terminal is on or off, whether the terminal is engaged in a call, and, if so, with whom the terminal is currently connected), indications of numbers or other digits or characters to have the terminal dial in particular instances, and a message set defining signals that can be sent to the wireless subscriber terminal so as to cause the subscriber terminal to carry out various functions. In an exemplary embodiment, the application program interface (API) or other data maintained by controller in memory can be modified or updated through a download from a server on wireless network 108 via terminal 106.

In the exemplary embodiment, when a user engages the actuator 114, the controller 122 may thus receive an actuation signal from the debounce module 118. Through responsive execution of an set of machine language instructions, the controller may interpret the actuation signal as simply an indication that the actuator has been engaged. Alternatively, the controller may analyze the actuation signal and thereby determine that the signal lasted for at least a predefined duration, such as 1.5 seconds, for instance, which may cause the controller to conclude that the actuator has been engaged for at least that predefined duration. Still alternatively, the actuation signal may carry other possibly more specific information, which the controller 122 may be programmed to recognize.

Further, through its coupling with the wireless subscriber terminal 106, the controller 122 is preferably arranged to determine or to know the status of the wireless subscriber terminal at any given moment. For instance, the coupling between terminal 106 and controller 122 may carry signals indicating that the terminal is (i) powered on, (ii) currently engaged in a call, (iii) currently ringing—i.e., receiving an incoming call—, or any other particular state. The controller 122 may either have access to this status information via that coupling, and/or the controller 122 may store the status information in its memory for access when it needs it.

Communications, including status information, between the wireless subscriber terminal 106 and the controller 122 may utilize a data signaling and control (DTC) protocol. For example, an open DTC protocol such as the AT communications protocol may be used, and, in particular, the command set within that protocol. The protocol may be an open, non-proprietary protocol or a proprietary protocol. Other examples and types of protocols are possible. Additionally, status information may be communicated between the wireless subscriber terminal 106 and the controller 122 using a packet of data that is, for example, one byte long. Other formats may be used to communicate status information, as well.

In response to its receipt of an actuation signal, the controller 122 may programmatically analyze the actuation signal and may note the status of the wireless subscriber terminal. In the exemplary embodiment, the controller may determine an action for the wireless subscriber terminal to take, based on a combination of (i) information derived from the actuation signals and (ii) the status of the subscriber terminal. The action to be taken may itself take a variety of forms. By way of example, the action may be: (i) simulate dialing of a specified sequence of digits and/or characters, (ii) simulate dialing of the "Talk" key, or (iii) simulate dialing of the "End" key.

The controller 122 then preferably sends a signal to the wireless subscriber terminal providing an instruction for the wireless subscriber terminal to take the designated action. The instruction signal may take any form (such as a code or series of codes for instance), as long as the subscriber terminal understands the meaning of the code (as a directive indicative of the action to be taken) and can therefore act responsively. The code may, for example, be a one-byte-long packet. Other data structures and other lengths are possible. When the wireless subscriber terminal receives the instruction, it then responsively carries out the action indicated. For example, if the instruction is to dial the "*" digit, then the wireless subscriber terminal preferably acts as if a user had manually dialed the "*" digit.

The action to be taken by the wireless subscriber terminal may have various effects, depending on the state of the terminal, the state of an entity with which the terminal is currently communicating (if any), and the state of subscriber profiles in the network for instance. For example, if the terminal is currently engaged in a call with another entity, then (i) if the action is dialing the "End" button, then the call may be terminated just as if the user had manually pressed the "End" button, and (ii) if the action is dialing a sequence of digits, then the digits would be received by the other entity and the result of dialing the digits may therefore depend on the configuration or state of the other entity. As another example, if the terminal is not currently engaged in a call but is receiving a ring signal, then (i) if the action is dialing the "Talk" button, the terminal may answer the call, just as if the user had manually pressed the "Talk" button, while (ii) if the action is pressing a sequence of digits followed by the "Talk" button, then the terminal may initiate a call based on the dialed digits, just as if the user had manually dialed the digits. Other examples are possible as well.

In the exemplary embodiment, the VAD server has access to an authorization database, indicating the identities of subscriber terminals that have subscribed to VAD service.

to the switch, the switch should route the call to the VAD server (which may be embodied in a service node (SN) or intelligent peripheral (IP) for instance) or to another designated platform or entity. For example, the profile may indicate that, when the switch receives the sole dialed digit "*" from a subscriber terminal, the switch should connect the terminal to the VAD server. Other examples are possible as well.

Table 1 provides examples of actuation signals, states of the terminal, responsive actions taken by the wireless subscriber terminal at the controller's instruction, and possible results of those actions in accordance with an exemplary embodiment of the invention. Of course, the examples provided in this table are illustrative only, and other examples are possible as well.

TABLE 1

| Actuation | Terminal State | Terminal Action | Result |
| --- | --- | --- | --- |
| One press | On and idle (and in a given service area) | Dial "*" and then "Talk" (which the service area recognizes as a feature code) | Telecom network connects the call to the VAD server or other such predefined entity. VAD server may then query the terminal for an authorization code, which the TIM controller may responsively cause the terminal to dial out. |
| One press | On an idle (and out of the given service area) | Dial 1-800-xxx-xxxx and then "Talk" | Telecom network connects the call to the VAD server or other such predefined entity. VAD server may then query the terminal for an authorization code, which the TIM controller may responsively cause the terminal to dial out. |
| Press and hold | In call | Dial "End" | Terminal disconnects the call in progress. |
| One press | Idle and ringing | Dial "Talk" | Terminal answers the incoming call. |
| One press | In VAD call | Dial "" sequence | VAD server recognizes the "" sequence as a request to disconnect the current call that the VAD server had connected for the terminal and to allow the user to speak another command. VAD server does so. |

The database may be keyed to mobile identification numbers (i.e., directory numbers) of subscriber terminals or any other information. The VAD server preferably includes a processor, a memory, and a set of machine language instructions and data stored in the memory and executable by the processor to carry out various functions described herein. For instance, aside from being able to recognize and act upon speech signals from a user, the VAD server may be programmed to recognize various tones (such as dual-tone-modulated-frequency (DTMF) tones) and to take predefined actions in response. Thus, for instance, if a subscriber terminal in communication with the VAD server emits a particular sequence of DTMF tones, the VAD server may responsively take a respective, programmed action. A "**" tone sequence (i.e., the tones that would result if a user pressed the "*" key twice) may mean that the VAD server should disconnect a call that is currently in progress.

Further, as is well known in the art, a local serving system (e.g., an MSC and/or visitor location register (VLR)) or a central controller (e.g., a service control point (SCP) or home location register (HLR)) may maintain profiles or logic that indicate where a switch should route a call in response to particular dialed digits. In the exemplary embodiment, one such profile may indicate that, when a subscriber terminal emits a particular digit or digit sequence Referring jointly now to FIGS. 2a, 2b, and 2c, an exemplary hands-free unit 214 with a push button actuator is shown. Hands-free unit 214 includes a push button control 216 and a microphone 218. The hands-free unit 214 may itself include the TIM. Thus, the hands-free unit may then be coupled to a wireless device 202 via a cable 210 and connector 208. The connector 208 may have an end portion 206 that can be inserted into a corresponding receptacle 204 in the wireless device. Further, the hands-free unit 214 may have a clip 220. The clip 220 may be used to connect the hands-free unit 214 to a person's clothes or to another entity.

Figure 2A:
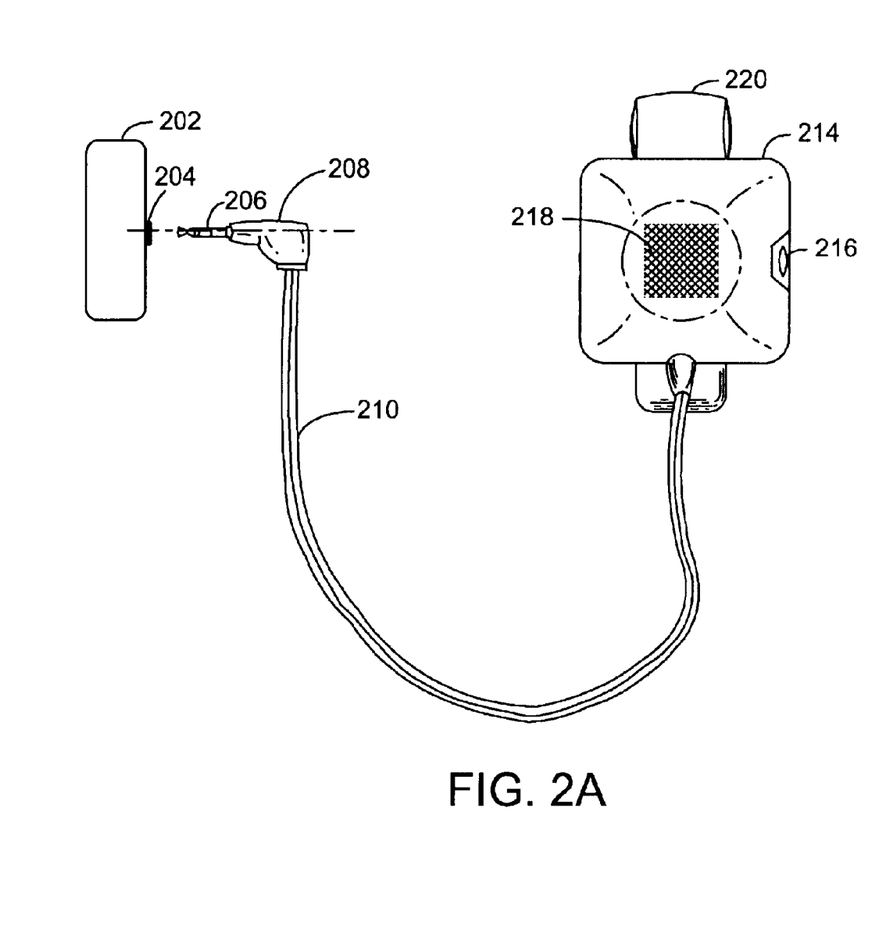
FIG. 2a is a perspective diagram of a hands-free unit according to an exemplary embodiment of the present invention.
Figures 2B, 2C:
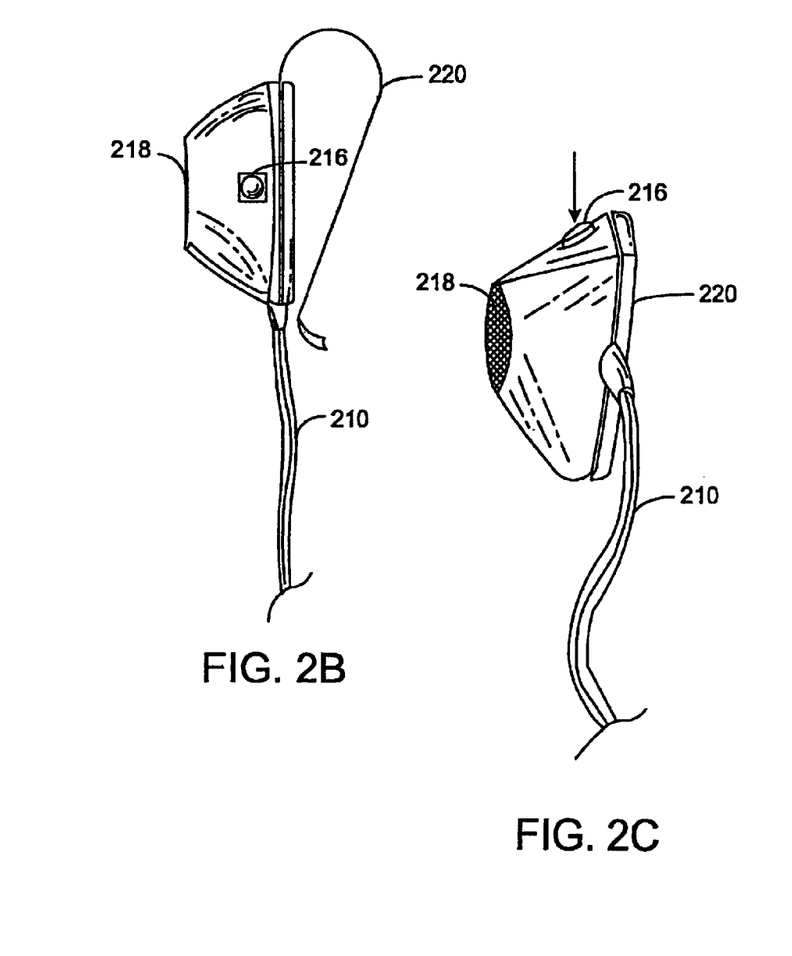
Figure 3:
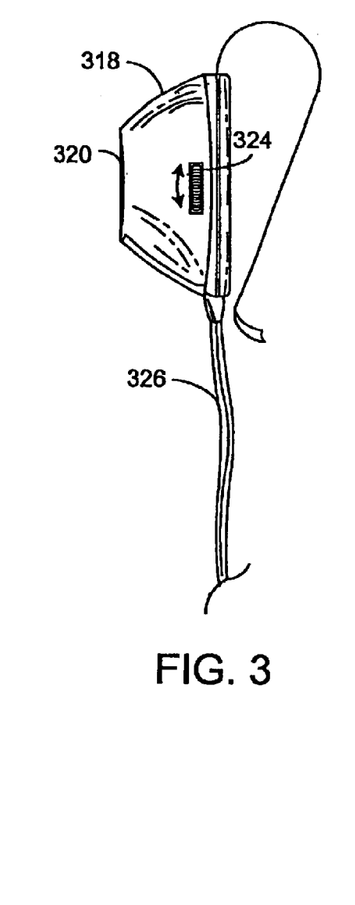
FIG. 3 is a perspective diagram of another hands-free unit according to an exemplary embodiment of the present invention.

FIG. 3 in turn shows another embodiment of an exemplary hands-free unit 318. In this other embodiment, the hands-free unit 318 includes a rotary dial 324 and a microphone 320. Further, as in the embodiment illustrated in FIG. 2, the hands-free unit may include the TIM and may be coupled to a wireless device (not shown) via a cable 326 and a connector (not shown).

Figure 4:
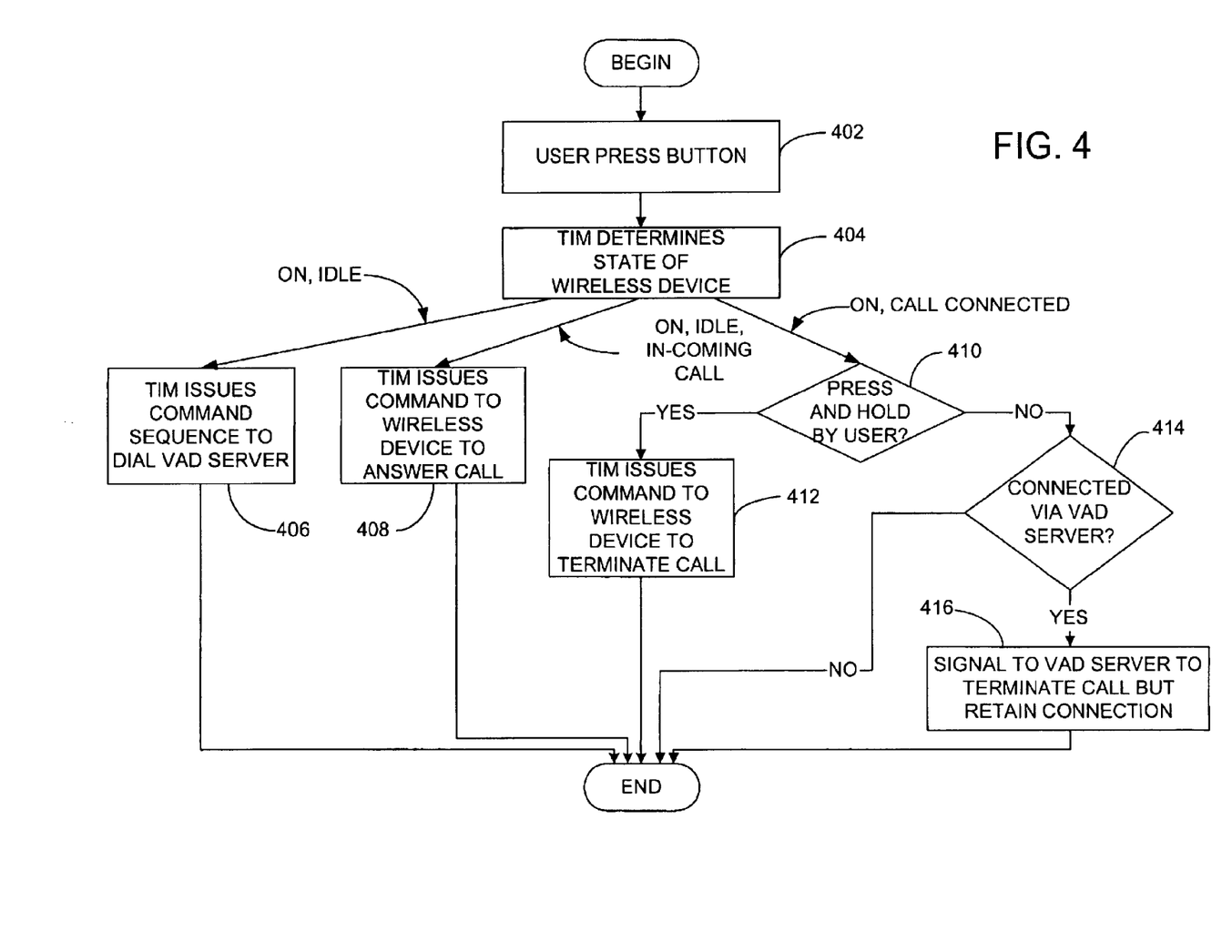
FIG. 4 is a is a flowchart of the operation of the system of FIG. 1 according to an exemplary embodiment of the present invention.

Referring now to FIG. 4, a flowchart depicting an exemplary operation of the system shown in FIG. 1 is provided. The steps illustrated and described are meant only to be examples of possible functions. At step 402 in FIG. 4, a user may press a button or otherwise engage an actuator. At step 404, the TIM then determines the state of the wireless device. In an exemplary embodiment, the wireless device may be in one of the following three states: (i) powered on but idle, (ii) powered on, idle, and receiving an incoming call, or (iii) powered on and connected to a call. Other examples of states are possible, depending, for instance, on the type of wireless device at issue.

If the TIM determines that the wireless device is on and idle, then, at step 406, the TIM sends a respective command sequence to the wireless device, causing the wireless device to dial the VAD server. The command sequence may, for instance, cause the wireless device to dial a feature code that the telecommunications network may convert into a directory number of a port at the VAD server, or it may cause the wireless device to dial a telephone number (such as a toll free number for instance) that will similarly amount to initiation of a call to the VAD server. The command "sequence" may be one or more digits and may take other forms and include other information as well.

Alternatively, if the TIM determines that the wireless device is on, idle and receiving an incoming call, then, at step 408, the TIM issues a command to the wireless device to answer the call, and the wireless device would do so accordingly. Still alternatively, if the TIM determines that the wireless device is on and connected to a call, then, at step 410 the TIM determines whether the actuation signal indicates that the user engaged the actuator for at least some predefined duration. If so, then, at step 412, the TIM issues a command to the wireless device to terminate the call (whether or not the call was placed through the VAD server), and the wireless device acts accordingly.

If the wireless device is engaged in a call but the user did not press and hold the actuator, then, at step 414, the TIM determines whether the current call is connected via the VAD) server (by reference to state information stored in the TIM controller's memory). If so, then, at step 416, the TIM issues a command to the wireless device to send a signal to the VAD server that will instruct the VAD server to terminate the current call but to stay connected with the wireless device so as to allow the user to initiate another VAD-based call. Communications, including status information, between the wireless subscriber terminal and the TIM may utilize a data signaling and control (DTC) protocol. For example, an open DTC protocol such as the AT communications protocol may be used, and, in particular, the command set within that protocol. The protocol may be an open, non-proprietary protocol or a proprietary protocol. Other examples and types of protocols are possible.

An exemplary embodiment of the present invention has been illustrated and described. It will be understood, however, that changes and modifications may be made without deviating from the spirit and scope of the invention, as defined by the following.

For example, although the foregoing description focuses in part on causing a subscriber terminal to connect to a VAD server, an exemplary embodiment of the invention could equally extend to causing a subscriber terminal to connect to some other network entity, such as an operator center for instance. Other variations are possible as well.

I claim:

1. A control system coupled externally to a subscriber terminal, the subscriber terminal having a status, the control system comprising, in combination:
   an actuator that can be selectively actuated by a human;
   a controller receiving an actuation signal in response to actuation of the actuator;
   a routine performed by the controller for (i) determining, based at least on the actuation signal and the status of the subscriber terminal, an action to be taken by the subscriber terminal, (ii) generating a directive indicative of the action, and (iii) sending the directive to the subscriber terminal,
   whereby the subscriber terminal may then take the action in response to the directive;
   wherein, if the subscriber terminal is on and engaged in a call placed via a voice-activated-dialing platform, then the action comprises the subscriber terminal sending one or more digits to the voice-activated-dialing platform suitable for instructing the voice-activated-dialing platform to disconnect the call but to retain a connection between the voice-activated-dialing platform and the subscriber terminal, whereby another call may then be placed from the subscriber terminal via the voice-activated dialing platform.

2. The control system of claim 1, further comprising:
   a microphone for receiving audio signals to be provided to the subscriber terminal, whereby the audio signals may comprise speech signals.

3. The control system of claim 1, further comprising:
   an audio output source for providing audio signals from the subscriber terminal to a speaker, to be heard by a human.

4. The control system of claim 1, wherein the actuator comprises a single button that can be actuated by the human.

5. The control system of claim 1, wherein the actuator comprises a single rotary dial.

6. The control system of claim 1, wherein:
   the controller comprises a processor, a memory, and a set of machine language instructions stored in the memory and executable by the processor; and
   the machine language instructions define the routine.

7. The control system of claim 1, wherein the subscriber terminal defines a plurality of functions and wherein the action comprises the subscriber terminal carrying out one or more of those functions.

8. The control system of claim 1, wherein, if the subscriber terminal is on and idle, then the action comprises the subscriber terminal dialing one or more digits suitable for establishing a dial-up connection to the voice-activated-dialing platform,
   whereby, once the subscriber terminal is connected to the voice-activated-dialing platform, a human may speak into a microphone so as to provide speech signals that may be recognized and acted upon by the voice-activated-dialing platform.

9. The control system of claim 8, wherein the one or more digits are selected from the group consisting of (i) a feature code and (ii) a telephone number.

10. The control system of claim 1, wherein the controller determines the action in response to the actuation signal reflecting that the actuator was actuated for at least a predetermined duration.

11. The control system of claim 10, wherein the predetermined duration is 1.5 seconds.

12. The control system of claim 1, wherein, if the subscriber terminal is on and receiving an incoming call, then the action comprises the subscriber terminal connecting to the call.

13. The control system of claim 1, wherein the subscriber terminal is a wireless subscriber terminal.

14. A method for controlling communications of a subscriber terminal, the subscriber terminal having a status, the method comprising, in combination:
   receiving an indication of the status of the subscriber terminal;

receiving an actuation signal provided in response to a human actuating an actuator;

in response to the indication of status and the actuation signal, determining an action to be taken by the subscriber terminal; and sending a directive to the subscriber terminal indicating the action to be taken, whereby the subscriber terminal may then take the action, wherein, if the subscriber terminal is on and engaged in a call placed via a voice-activated-dialing platform, then the action comprises the subscriber terminal sending one or more digits to the voice-activated-dialing platform suitable for instructing the voice-activated-dialing platform to disconnect the call but to retain a connection between the voice-activated-dialing platform and the subscriber terminal, whereby another call may then be placed from the subscriber terminal via the voice-activated dialing platform.

15. The method of claim 14, wherein, if the subscriber terminal is on and idle, then the action comprises the subscriber terminal dialing one or more digits suitable for establishing a dial-up connection to the voice-activated dialing platform.

16. The method of claim 15, wherein the one or more digits are selected from the group consisting of (i) a feature code and (ii) a telephone number.

17. The method of claim 14, wherein determining the action comprises determining the action based at least in part on the actuation signal reflecting that the actuator was actuated for at least a predetermined duration.

18. The method of claim 17, wherein the predetermined duration is 1.5 seconds.

19. The method of claim 14, wherein, if the subscriber terminal is on and receiving an incoming call, then the action comprises the subscriber terminal connecting to the call.

20. The method of claim 14, wherein the subscriber terminal is a wireless subscriber terminal.

21. A control system coupled externally to a subscriber terminal, the subscriber terminal having a status, the control system comprising, in combination:

an actuator that can be selectively actuated by a human;

a controller receiving an actuation signal in response to actuation of the actuator; and a routine performed by the controller for (i) determining, based at least on the actuation signal and the status of the subscriber terminal, an action to be taken by the subscriber terminal, (ii) generating a directive indicative of the action, and (iii) sending the directive to the subscriber terminal, whereby the subscriber terminal may then take the action in response to the directive, wherein, if the status is a first status, then the controller determines a first action to be taken by the subscriber terminal, generates a first directive indicative of the first action, and sends the first directive to the subscriber terminal, wherein, if the status is a second status, then the controller determines a second action to be taken by the subscriber terminal, generates a second directive indicative of the first action, and sends the second directive to the subscriber terminal, wherein the first status is different than the second status, the first action is different than the second action, and the first directive is different than the second directive, and wherein, if the subscriber terminal is on and engaged in a call placed via a voice-activated-dialing platform, then the action comprises the subscriber terminal sending one or more digits to the voice-activated-dialing platform suitable for instructing the voice-activated-dialing platform to disconnect the call but to retain a connection between the voice-activated-dialing platform and the subscriber terminal, whereby another call may then be placed from the subscriber terminal via the voice-activated dialing platform.

22. A method for controlling communications of a subscriber terminal, the subscriber terminal having a status, the method comprising, in combination:

receiving an indication of the status of the subscriber terminal;

receiving an actuation signal provided in response to a human actuating an actuator;

if the status is a first status, then, in response to the indication of status and the actuation signal, determining a first action to be taken by the subscriber terminal; and sending a first directive to the subscriber terminal indicating the first action to be taken, whereby the subscriber terminal may then take the first action;

if the status is a second status, then, in response to the indication of status and the actuation signal, determining a second action to be taken by the subscriber terminal; and sending a second directive to the subscriber terminal indicating the second action to be taken, whereby the subscriber terminal may then take the second action, wherein the first status is different than the second status, the first action is different than the second action, and the first directive is different than the second directive, and wherein, if the subscriber terminal is on and engaged in a call placed via a voice-activated-dialing platform, then the action comprises the subscriber terminal sending one or more digits to the voice-activated-dialing platform suitable for instructing the voice-activated-dialing platform to disconnect the call but to retain a connection between the voice-activated-dialing platform and the subscriber terminal, whereby another call may then be placed from the subscriber terminal via the voice-activated dialing platform.

* * * * *